US006694148B1

United States Patent
Frodigh et al.

(10) Patent No.: US 6,694,148 B1
(45) Date of Patent: Feb. 17, 2004

(54) TRANSMIT POWER CONTROL FOR MCPA-EQUIPPED BASED STATIONS

(75) Inventors: Magnus Frodigh, Sollentuna (SE); Christer Johansson, Solna (SE); Bo Hedberg, Kista (SE); Patrick Eriksson, Bro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/360,141

(22) Filed: Jul. 26, 1999

(51) Int. Cl.$^7$ .............................. H04B 7/00; H04B 1/04; H04B 7/212; H04Q 7/20; H01Q 11/12

(52) U.S. Cl. ................. 455/522; 455/127.1; 455/127.2; 370/337; 370/347

(58) Field of Search ................................ 455/522, 561, 455/127.1, 127.2, 103, 232.1, 234.1, 245.1, 250.1; 370/318, 336, 337, 347, 344; 375/260, 295, 345; 330/254, 278, 129, 130

(56) References Cited

U.S. PATENT DOCUMENTS

| | | | |
|---|---|---|---|
| 4,670,899 A | 6/1987 | Brody et al. | |
| 5,241,685 A | 8/1993 | Bodin et al. | |
| 5,384,547 A | 1/1995 | Lynk, Jr. et al. | 330/136 |
| 5,398,247 A | * 3/1995 | Delprat et al. | 370/347 |
| 5,625,868 A | 4/1997 | Jan et al. | |
| 5,894,498 A | 4/1999 | Kotzin et al. | 375/295 |
| 6,256,502 B1 | * 7/2001 | Santa et al. | 455/442 |
| 6,477,388 B1 | * 11/2002 | Schmutz | 455/522 |
| 6,570,929 B1 | * 5/2003 | Eriksson | 375/260 |
| 6,574,202 B1 | * 6/2003 | Himayat et al. | 370/329 |

FOREIGN PATENT DOCUMENTS

| | | |
|---|---|---|
| EP | 0 719 001 | 6/1996 |
| EP | 0 743 768 | 11/1996 |

OTHER PUBLICATIONS

Wulich, D., "Peak Factor In Orthogonal Multicarrier Modulation With Variable Levels", Electronics Letters, GB, IEE Stevenage, vol. 32, No. 20, Sep. 26, 1996, pps. 1859–1861, XP 002042110.

International Search Report, Application No. PCT/SE00/01386, mailed Sep. 5, 2000.

U.S. patent application No. 09/349,717, by Patrick Eriksson, filed Jul. 8, 1999.

* cited by examiner

*Primary Examiner*—Vivian Chin
*Assistant Examiner*—Raymond B Persino

(57) ABSTRACT

A transmit power control system and method is provided which utilizes an efficient allocation of average output power of a multi-carrier power amplifier (MCPA), the average output power being a weighted average of the actual power over multiple time slots. Periodically, using the efficient allocation system and method, there will be short periods where the desired average output power will exceed the maximum tolerable power of the MCPA, $P_{MCPA}$. These short periods in which the desired output power will exceed $P_{MCPA}$ are handled by a system and method which produces a reduced margin between the total power per time slot and $P_{MCPA}$. This reduced margin allows the MCPA to serve a larger number of users per time slot than conventional MCPAs. Alternatively, the MCPA can serve the same number of users as a conventional MCPA, but with higher demands on output power for each user and/or more efficient use of the MCPA's resources.

25 Claims, 8 Drawing Sheets

FIG. 2

| | Time Slot 1 | 2 | 3 | 4 | 5 | 6 | 7 | 8 |
|---|---|---|---|---|---|---|---|---|
| 1 | 4 | | 5 | 8 | 7 | | 3 | |
| 2 | | 3 | | | | 4 | 8 | 2 |
| 3 | | 8 | 4 | 3 | 3 | | | |
| 4 | 8 | 3 | 7 | | | 3 | 7 | |
| 5 | | | 2 | 4 | | 4 | 8 | 7 |
| 6 | | 2 | 4 | | 5 | | | 5 |
| 7 | 3 | | 8 | 5 | | 8 | 4 | |

FREQUENCY (row labels)

| 43 | 59 | 172 | 77 | 44 | 73 | 145 | 40 |

IN-PHASE POWER SUM PER TIME SLOT

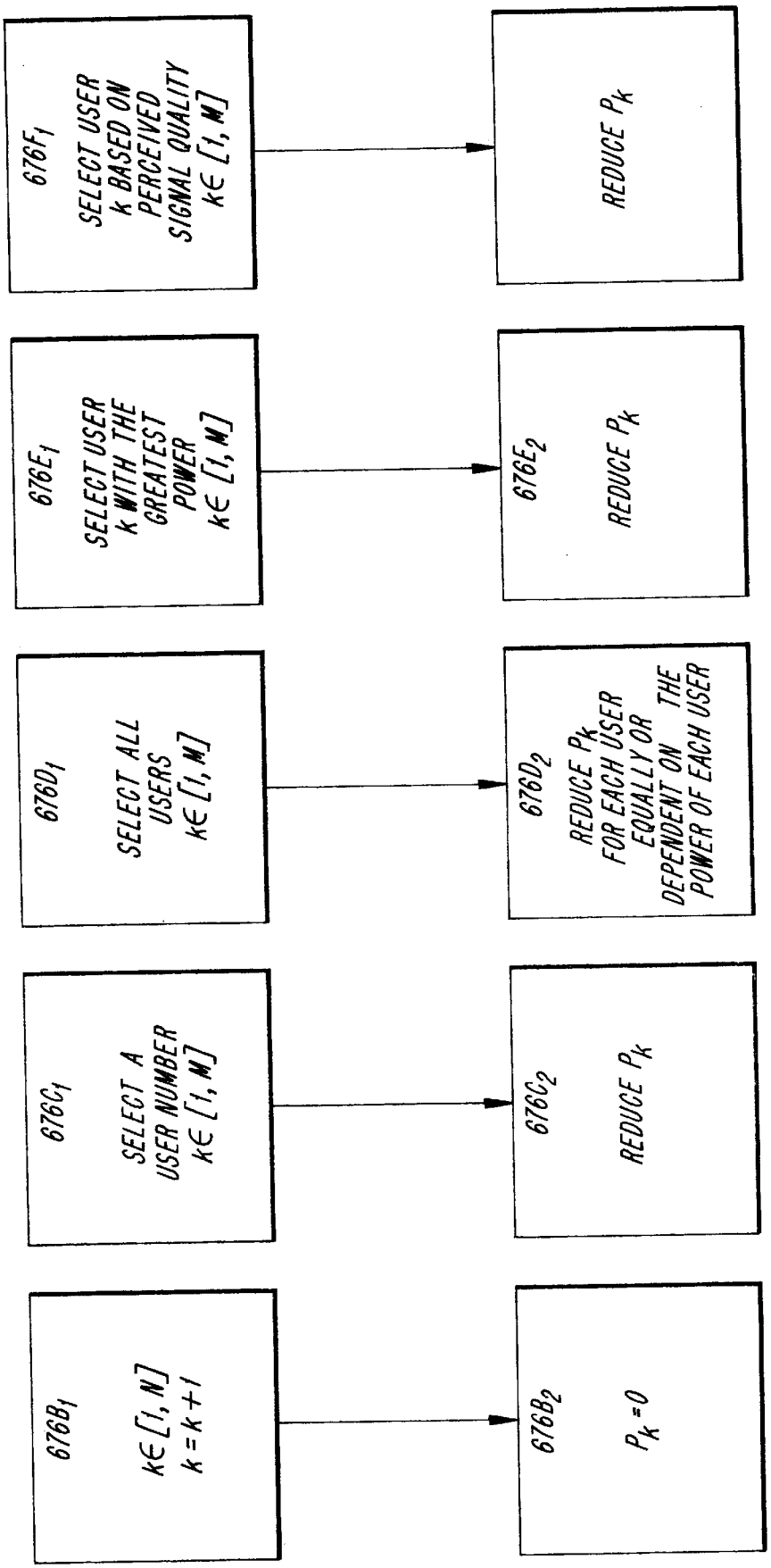

US 6,694,148 B1

TRANSMIT POWER CONTROL FOR MCPA-EQUIPPED BASED STATIONS

CROSS-REFERENCE TO RELATED APPLICATIONS

This application is related to co-pending U.S. patent application No. Ser. 09/349,717, filed on Jul. 8, 1999, entitled "Power Control Scheme for Maximizing Carrier Signal-to-Noise Ratio in Multicarrier Transmitters," which is incorporated herein by reference in its entirety.

BACKGROUND

The present invention relates generally to cellular communication systems. More precisely, the present invention relates to a transmit power supervision method for a base station equipped with a multi-carrier power amplifier (MCPA).

In conventional cellular systems, a base station is allocated a predetermined number of frequency channels for communication with mobile stations. In the base station a separate transmitter is employed for each frequency channel. However, the use of separate transmitters for each frequency channel results in a duplication of parts and an increase in cost due to the additional hardware required. Thereafter, it was realized that the hardware cost per channel could be reduced by using multicarrier transmitters in place of the plurality of single carrier transmitters to transmit a plurality of frequency channels. Since multicarrier transmitters transmit over a broad range of frequencies, they are also sometimes referred to in the art as wideband transmitters. However, for ease of discussion, the transmitters will be referred to herein as multicarrier transmitters.

FIG. 1 illustrates a conventional multicarrier transmitter 100 which may be used to transmit multiple frequency channels from a base station in a radiocommunication system. The conventional multicarrier transmitter 100 operates as follows. A number N of baseband frequency data signals $BB_1 \ldots BB_N$ are modulated by modulators $Mod_1 \ldots Mod_N$, respectively, where the bits associated with each data signal are symbol encoded for transmission, i.e., the modulator generates the corresponding baseband waveform. Each of the modulated data signals is forwarded to a corresponding digital power control module $DPC_1 \ldots DPC_N$, where each DPC adjusts the signal power level of the corresponding modulated data signal based on the commands provided by the Radio Control Unit 150. More specifically, the power level of each modulated data signal is adjusted such that the absolute power level of each carrier $P_{k,out}$ at the transmitter is equal to the amount of power required for the carrier to reach a particular mobile station which is to receive the carrier, where k varies from 1 to N and identifies the corresponding baseband frequency data signals $BB_1 \ldots BB_N$.

The modulated data signals are then forwarded from the digital power control modules $DPC_1 \ldots DPC_N$ to multipliers $Mult_1 \ldots Mult_N$, respectively, where each modulated data signal is upconverted to a corresponding carrier frequency. The upconverted signals are then summed by adder 110. The compound signal produced by adder 110 is then forwarded to the digital-to-analog converter (DAC) 120. The resulting compound analog signal is then passed from DAC 120 through an analog transmitter chain which includes analog amplifier 160, upconverter (not shown), and filters (not shown). Analog amplifier 160 then amplifies the compound signal by a fixed gain $G_{ana}$. For ease of discussion $G_{ana}$ has been described as the gain of analog amplifier 160, however, one skilled in the art will recognize that $G_{ana}$ represents the total gain of the analog section of the transmitter, including losses due to filters and upconverters. A more detailed discussion of multicarrier transmitters can be found in "Base-Station Technology Takes Software-Definable Approach" by Richard M. Lober, Wireless System Designs, Feb. 1998, which is herein incorporated by reference.

Multicarrier transmitters are designed to handle a maximum number of simultaneous carriers N. In designing a multicarrier transmitter, care must be taken to ensure that the instantaneous in-phase power sum, $P_{sum}$ of the N carriers does not exceed the maximum tolerable power of the MCPA. $P_{sum}$ can be calculated using equation (1) below, where $P_n$ represents the power of a specific user, n, in a specific time slot on a specific carrier frequency, and N is the total number of carrier frequencies used by the base station. Normally, $P_n$ is equal to the peak power within the specific time slot.

The instantaneous in-phase power sum of a single time slot for a system having, for example, a constant envelope (such as a GSM system), is given by:

$$P_{sum} = \left( \sum_{n=1}^{N} \sqrt{P_n} \right)^2 \qquad (1)$$

For example, if the instantaneous sum of the N carrier frequencies exceeds the full scale range of the DAC, i.e., the value associated with the greatest digital code that can be converted into an analog value, the DAC will clip the analog signal. Clipping, i.e., preventing the analog signal from exceeding the amplitude corresponding to the full scale range of the DAC will have an adverse effect on the quality of the transmitted signal. However, one skilled in the art will recognize that in practical applications, a system might tolerate a power level which exceeds the DAC's full scale range by a small amount for short periods of time without suffering a decrease in system performance.

In a multicarrier transmitter with N carrier frequencies, the abovementioned "clipping" of the analog signal can be avoided by setting the full scale range of the DAC to 20*log(N) dB above the maximum allowed peak power level of any individual carrier 1 . . . N, since the full scale range set 20*log(N) dB above the maximum power level of any individual carrier represents the greatest power level attainable by the sum of the N carriers.

Designing MCPAs with a high output power is a difficult and expensive task. As the MCPA is designed to have a higher maximum output power, design costs become increasingly more expensive. For a base station operating using time division multiple access (TDMA), the maximum total output power of the base station limits the total output power of the frequency carriers at any time slot. TDMA, as one skilled in the art will appreciate, is a communication technique whereby different signals are assigned to different time slots on the same frequencies. One problem associated with MCPAs designed for a particular output power and operating in a TDMA environment is that a MCPA can only serve a predetermined maximum number of users for the respective particular output power. If more than the predetermined maximum number of users were to be allocated to the MCPA, the MCPA would lose linearity resulting in a decrease in link quality.

FIG. 2 illustrates an exemplary time chart which may be associated with a base station. In FIG. 2, seven frequencies (1–7) in use by an exemplary base station are illustrated over eight time slots. The numbers in the time chart indicate the required output power, in watts, for a mobile unit which is operating at a particular frequency and assigned to a particular time slot. For example, at frequency 1 and time slot 1, the mobile unit requires 4 watts (W). $P_{sum}$ for each time slot is depicted below the time chart.

Assuming, for example, that the maximum power level that can be allocated for each mobile unit is set to 8W, then using Equation (1), the serving MCPA must be designed for at least a maximum output power of 392W. That is, the MCPA must be designed to handle the worst-case scenario of each of the mobile units receiving at their maximum allocated power, 8W. As seen in FIG. 2, the in-phase power sum per time slot, $P_{sum}$ will usually be lower than the maximum output power of 392W. This difference illustrates how the MPCA will not be used efficiently, since it must be designed to handle a worst-case scenario of all users being allocated the maximum output power for a given time slot.

Several techniques have been developed for extending the maximum capacity for which MCPAs have been dimensioned. Load sharing is one such technique. Conventional load sharing is basically a type of load balancing where a user is transferred from one cell which has reached its maximum capacity to another cell which can accommodate the user. This technique avoids overload situations. The following patents illustrate conventional load sharing techniques.

A method of balancing the load among cells which are operating at maximum capacity is described in U.S. Pat. No. 4,670,899, by Brody et al., and entitled "Load Balancing for Cellular Radio Telephone System." In Brody et al., the loading of various cells is dynamically redistributed by selectively transferring ongoing calls to adjacent cells in accordance with traffic levels in order to reserve channels for handoffs and for new calls. A channel occupancy level for a cell is periodically determined by comparing the number of channels utilized to the number of channels available within the cell. Calls are handed off before all the channels are utilized, thereby allowing at least one or more channels to be reserved for new or incoming calls.

According to the Brody et al. patent, if there is a mobile unit on the periphery of the cell which is also within the range of a neighboring cell, the mobile unit will be transferred to the neighboring cell in order to make room for a new call or an ongoing call associated with a mobile unit which will be handed off to the cell. While Brody et al. provides traffic-based control for call handoffs from one cell to an adjacent cell, handoffs due to load balancing are handled differently from handoffs due to mobile units leaving the cell. This creates a very complex system.

In U.S. Pat. No. 5,625,868 to Jan et al., and entitled "Dynamic Traffic Load Distribution Method," the control over a call is transferred from a first satellite to a second satellite having a partially overlapping coverage area with the first satellite when the power consumption level in the first satellite exceeds a certain predetermined level. This is accomplished by switching the channel off in the first satellite and on in the second satellite.

In commonly assigned U.S. Pat. No. 5,241,685 to Bodin et al., and entitled "Load Sharing Control for a Mobile Cellular Radio System," the entirety of which is incorporated by reference herein, a load sharing method is set forth which is based upon the occupancy of the channels defined by the ratio between the number of occupied channels to the number of available channels.

In commonly assigned U.S. patent application Ser. No. 09/166,159 to Johansson et al., and entitled "Load Sharing for MCPA-Equipped Base Stations," the entirety of which is incorporated by reference herein, a method is set forth by which users are moved between time slots or between base stations in order to better utilize MCPA output power resources. The power of all transceivers served by a certain MCPA is compared to a threshold value. The threshold value is at least related to the capability of the MCPA in terms of output power. If at no times the sum of the output power exceeds the threshold value, it is assumed that the MCPA can handle all simultaneous transmissions. If, during at least one time slot it is found that the required output power exceeds the capability of the serving MCPA, then a reallocation or load sharing algorithm is invoked. The reallocation algorithm searches for time slots to which a reallocation could be performed within the same base station or number of transceivers served by the MCPA. If no time slots can handle users from the time slot in which the MCPA limit is exceeded, then a load sharing algorithm is activated and one starts to look for transmission resources in transceivers served by other MCPAs.

SUMMARY

The present invention distinguishes over the above techniques by providing a more efficient allocation of average output power for a MCPA, the average output power being a weighted average of the actual power over multiple time slots. Periodically, using the more efficient allocation system and method of the present invention, there will be short periods where the desired output power will exceed the maximum tolerable power of the MCPA, $P_{MCPA}$. These short periods in which the desired output power will exceed $P_{MCPA}$ are handled by an exemplary embodiment of the present invention which produces a reduced margin between the average total power over several time slots and $P_{MCPA}$. This reduced margin allows the MCPA of the present invention to serve a larger number of users per time slot than conventional MCPAs. Alternatively, the MCPA of the present invention can serve the same number of users as a conventional MCPA, but with higher demands on output power for each user and/or more efficient use of the MCPA's resources.

According to a first aspect of the present invention, a method for power control in a radio communication system is provided. The method includes determining a power requirement for an output signal; comparing the power requirement with a threshold power value; and modifying the output signal when the power requirement is greater than the threshold power value such that the modified output signal has a power requirement which is less than or equal to the threshold power value.

According to a further aspect of the present invention, a method for power control in a radio communication system is provided. The method includes allocating a respective power for at least one of a plurality of mobile terminals such that an instantaneous power of an output signal for said plurality of mobile terminals will exceed a threshold power value of a power amplifier; determining a power requirement for the output signal; comparing the power requirement for the output signal with the threshold power value; and modifying the output signal when the power requirement is greater than the threshold power value such that the modified output signal has a modified power requirement which is less than or equal to the threshold power value.

According to a further aspect of the invention, a power control system for a radio communication system is provided. The power control system includes a power supervision unit which determines a power requirement for a portion of an output signal and compares the power requirement with a threshold power value; and a signal control unit which modifies the output signal when the power requirement is greater than the threshold power value such that the modified output signal has a modified power requirement which is less than or equal to the threshold power value.

According to a further aspect of the invention, a power control system is provided. The power control system includes means for allocating a respective power level for at least one of a plurality of mobile terminals such that an instantaneous power of an output signal for the plurality of mobile terminals will exceed a threshold power value of a power amplifier; means for determining a power requirement for the output signal; means for comparing the power requirement of the output signal with the threshold power value; and means for modifying the output signal when the power requirement is greater than the threshold power value such that the modified output signal has a modified power requirement which is less than or equal to the threshold power value.

According to a further aspect of the invention, a power control system for a radio communication system is provided. The power control system includes a power supervision unit which determines a power requirement for an output signal and compares the power requirement with a threshold power value. A signal control unit variably modifies the output signal in a digital domain and in an analog domain and a power suppression unit coupled to the signal control unit modifies the power requirement when the power requirement is greater than the threshold power value such that the modified output signal has a modified power requirement which is less than or equal to the threshold power value.

According to a further aspect of the invention, a power control system for a radio communication system is provided. The power control system includes a digital power control module; a digital-to-analog converter; an analog power control module; a radio control unit for adjusting a gain of the digital power control module and for adjusting a gain of the analog power control module; and a power suppression unit coupled to the radio control unit for providing power control commands to the digital power control module.

According to a further aspect of the invention, a method for power control in a radio communication system is provided. The method includes determining a power requirement for an output signal; comparing the power requirement with a threshold power value; variably modifying the output signal in a digital domain and in an analog domain; and modifying the power requirement when the power requirement is greater than the threshold power value such that the output signal has a modified power requirement which is less than or equal to the threshold power value.

According to a further aspect of the invention, a method of power control in a radio communication system is provided. The method includes modulating a plurality of baseband data streams; adjusting a power level of each of the plurality of modulated baseband data streams; upconverting, to a respective carrier frequency, each of the plurality of power modulated baseband data streams to form a plurality of individual carriers; combining the plurality of individual carriers into a single data stream with a power level requirement which is a function of the power levels associated with the plurality of individual carriers; modifying the power level requirement of the single data stream; converting the single data stream into an analog waveform; and variably adjusting the power level of the analog waveform.

It is desirable to limit $P_{MCPA}$ by reducing the margin between the average transmit power over several time slots and $P_{MCPA}$ in order to, for example, reduce the cost of the MCPA. The power control method of the present invention allows for a lower $P_{MCPA}$, and, therefore, a lower cost MCPA to be employed by a base station. In addition, the present invention does not need to sacrifice quality in order to reduce costs since it is able to maintain sufficient average power.

BRIEF DESCRIPTION OF THE DRAWINGS

The above objects and features of the present invention will be more apparent from the following description of the preferred embodiments with reference to the accompanying drawings, wherein:

FIG. 2 illustrates an exemplary time chart which may be associated with a base station;

FIGS. 6A–6F illustrate power control methods according to exemplary embodiments of the present invention.

DETAILED DESCRIPTION

Figure 3:
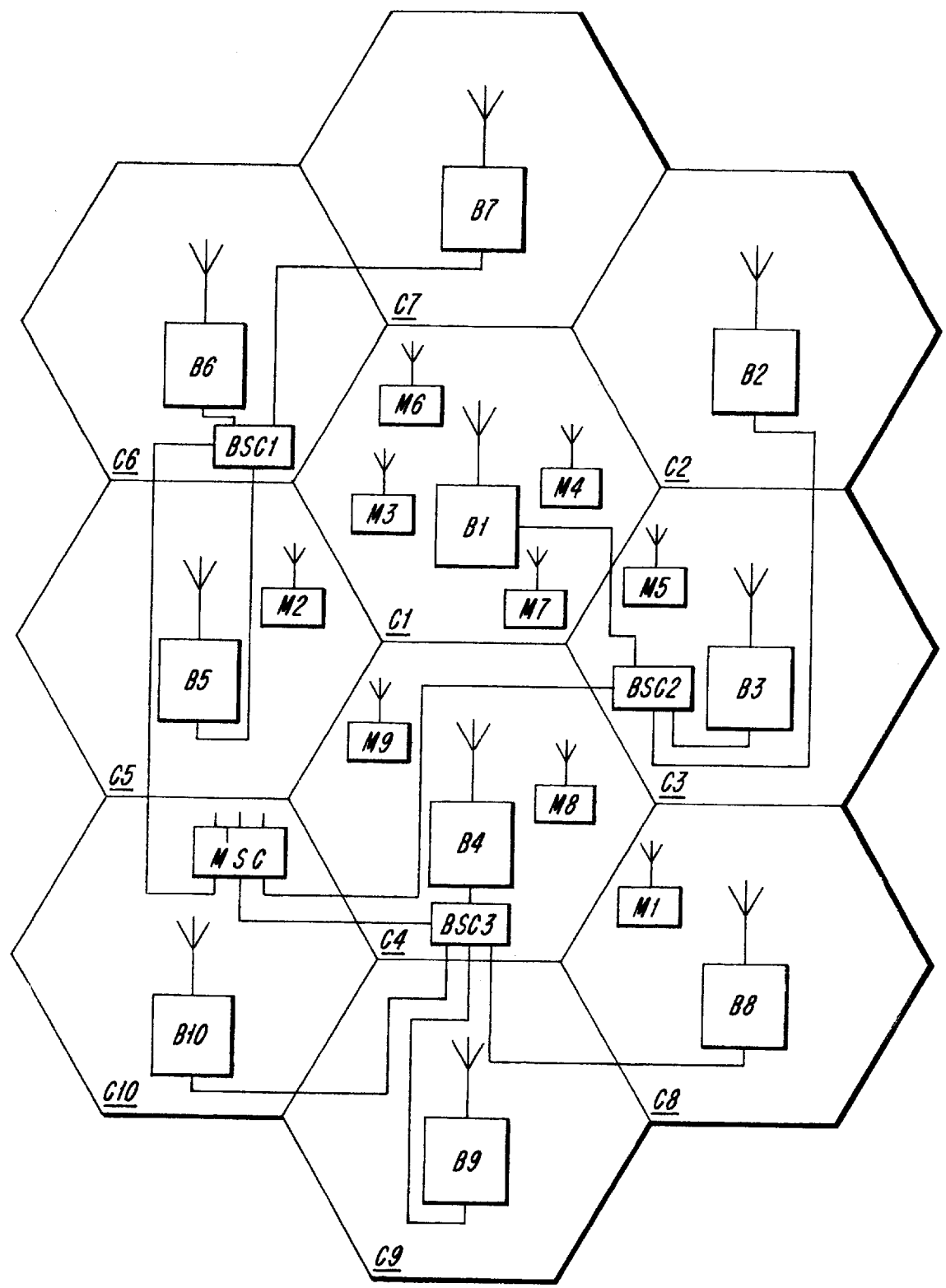
FIG. 3 illustrates an exemplary cellular mobile radio system.

FIG. 3 illustrates an exemplary cellular mobile radio system. In FIG. 3, the cellular mobile radio system is illustrated as comprising ten cells. One skilled in the art will appreciate that a typical cellular mobile radio system commonly includes more than ten cells; however, for the sake of brevity, the present invention is explained using the simplified representation illustrated in FIG. 3.

Each cell C1–C10 has a corresponding base station B1–B10. FIG. 3 illustrates the base stations as situated in the vicinity of the cell center and having omni-directional antennas. The cells C1–C10 are, therefore, schematically represented as hexagons. The base stations of adjacent cells may, however, be co-located in the vicinity of cell borders and have directional antennas as is well known to those skilled in the art. The base stations, according to exemplary embodiments of the present invention, are equipped with MCPAs and operate using time division multiple access (TDMA) techniques. In an additional exemplary embodiment of the present invention, a single MCPA is shared by multiple co-located base stations.

FIG. 3 also illustrates nine mobile stations M1–M9, moveable within a cell and among a plurality of cells. In a typical cellular radio system there would normally be more than nine cellular mobile stations. In fact, there are typically many times the number of mobile stations as there are base stations. However, for the purpose of explaining the invention, the reduced number of mobile stations is sufficient.

Also illustrated in FIG. 3 is an exemplary number of base station controllers BSC1–BSC3 and a mobile switching center MSC. The base station controllers BSC1–BSC3 control the operation of the base stations. The mobile switching center MSC is connected to each of the base station controllers BSC1–BSC3 and to a fixed public switching telephone network or similar fixed network (not shown). While only one mobile switching center is illustrated in FIG. 3, one skilled in the art will appreciate that additional mobile switching centers may be employed. In addition, one skilled in the art will also appreciate that exemplary cellular mobile radio systems can also operate without the use of base station controllers.

Figure 1:
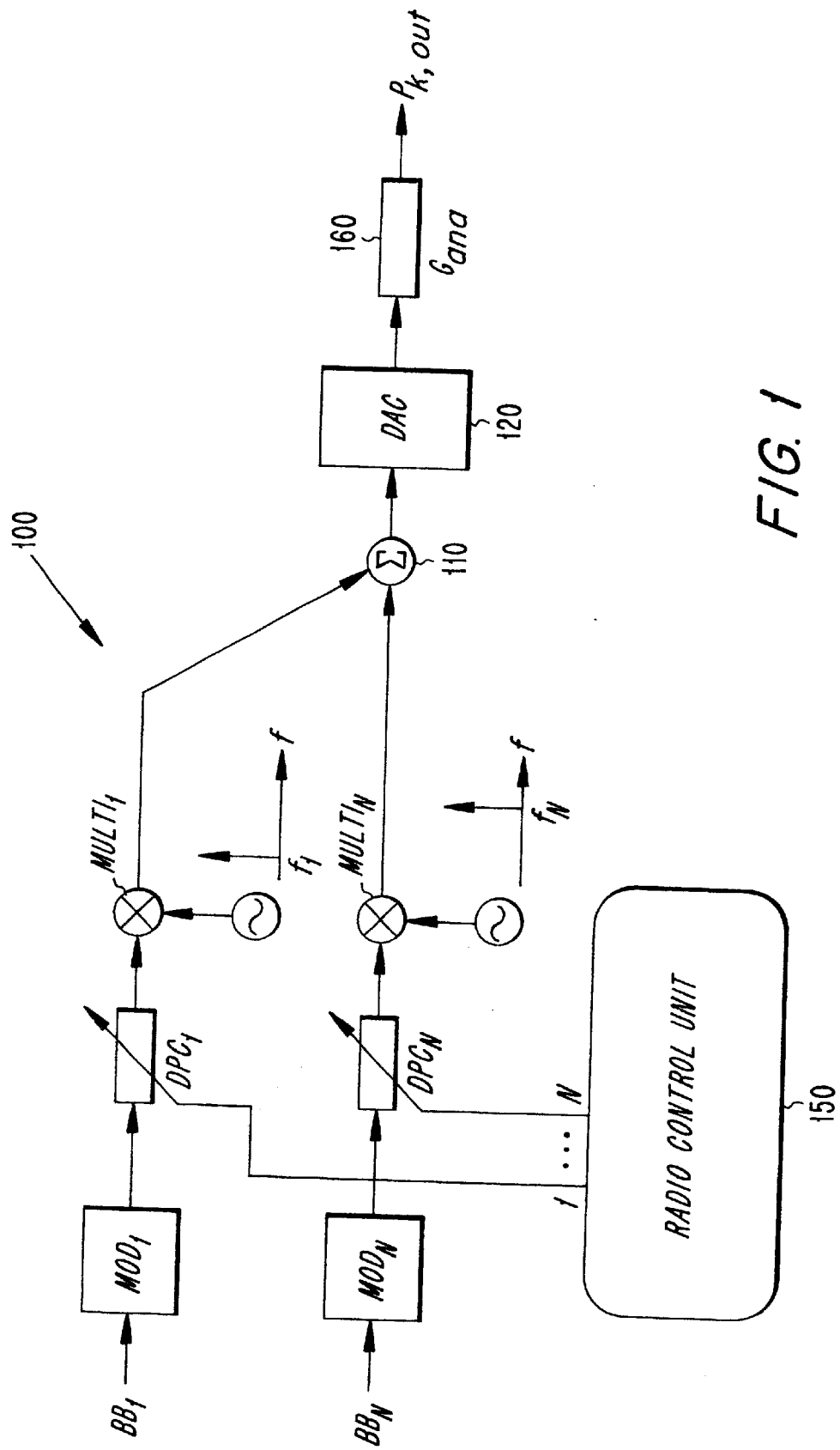
FIG. 1 illustrates a conventional base station employing a MCPA.

As mentioned above, the present invention is most applicable to a TDMA environment where the power of a system is limited. An exemplary base station in which the method of the present invention may be implemented was set forth above with respect to FIG. 1. Such a base station, operating in a TDMA environment, is commonly associated with a plurality of frequency carriers. Each frequency carrier is divided into a plurality of time slots to which mobile stations are assigned. Returning to FIG. 2, for example, the frequencies associated with an exemplary base station are depicted. Each of the seven frequencies is divided, for explanatory purposes, into eight time slots. Mobile users would be assigned to one or more time slots for transmission purposes.

When the MCPA has been calibrated to a particular maximum tolerable output power, $P_{MCPA}$, exceeding that maximum limit results in a loss in linearity. A loss in linearity can cause an increase in spurious emissions from, for example, intermodulation products. $P_{MCPA}$ can be limited by any sub-component within the transmitter chain. That is, the maximum tolerable power can be reduced by, for example, limitations of amplifiers, filters, digital-to-analog converters, and/or upconverters. Therefore, it is desirable to limit $P_{MCPA}$ by reducing the margin between the average transmit power over several time slots and $P_{MCPA}$ in order to, for example, reduce the cost of the MCPA. The power control method of the present invention allows for a lower $P_{MCPA}$, and, therefore, a lower cost MCPA to be employed by a base station. In addition, the present invention does not need to sacrifice quality in order to reduce costs since it is able to maintain sufficient average power.

Alternatively, the MCPA of the present invention can accommodate more users than conventional MCPAs by an efficient use of the MCPA's resources.

The probability that all of the users on the same time slot of a base station are active is given by:

$$P_r(\text{AllActive}) = \prod_{n=1}^{N} x_n \approx x^N \qquad (2)$$

where N is the number of users per time slot and x is the speech activity per user. Speech activity is typically measured by detecting talk spurts and silence periods. Assuming that all users have the same speech activity, then $P_r(\text{AllActive})=x^N$. For example, with eight users each having a 50% speech activity, the probability of all users being active is as low as 1/256 or 0.4%.

Figure 4:
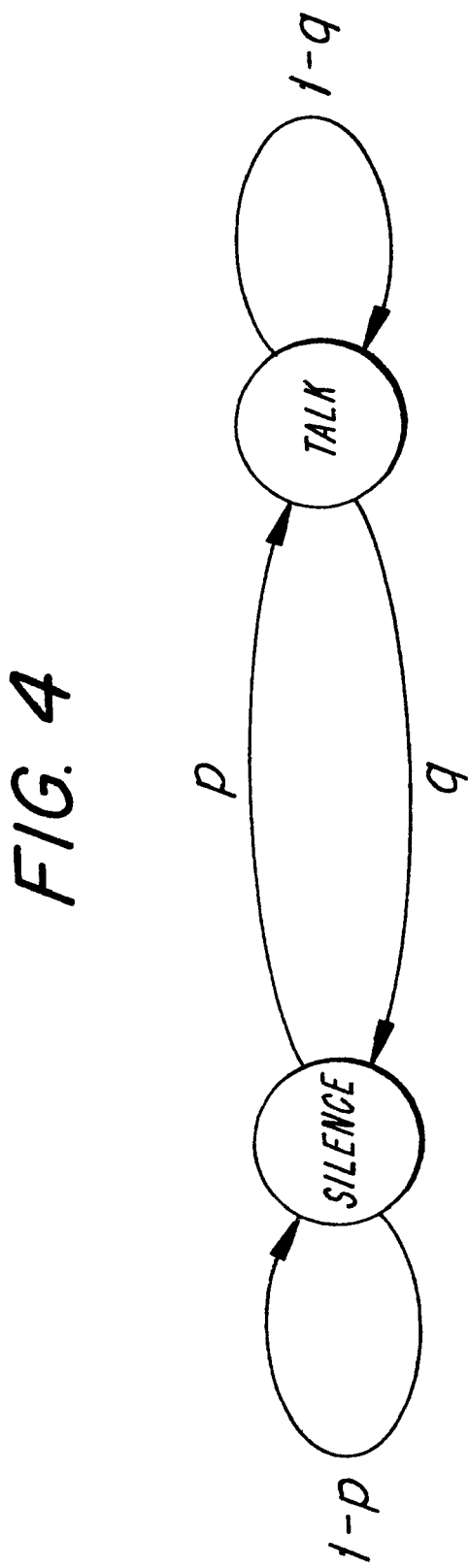
FIG. 4 illustrates an exemplary probability model utilized by the present invention.

FIG. 4 illustrates a model of the probability of talk spurts and silence periods for exemplary users of the present invention. The probability for a user to be in a talk spurt is given by:

$$P_r(\text{Talk}) = \frac{p}{q+p} \qquad (3)$$

where p is the probability of the user changing states from a silence period to a talk spurt and q is the probability of user changing from a talk spurt to a silence period. The probability for a user being in a silent period is given by:

$$P_r(\text{Silence}) = \frac{q}{q+p} \qquad (4)$$

Using equations (3) and (4) and taking into account that calls made by each user are independent of each other, the probability that at least n out of y users are active is given by:

$$P_r(X \geq n) = \sum_{x=n}^{y} \binom{y}{n} \left(\frac{p}{q+p}\right)^x \left(\frac{q}{q+p}\right)^{y-x} \qquad (5)$$

For example, the probability of n out of y users being active when n approaches y is extremely low. Therefore, even if the maximum transmit power of each user is set such that in the worst case (i.e., all users are active at the same time) $P_{MCPA}$ is exceeded, the actual probability of exceeding $P_{MCPA}$ will be extremely low. However, even though the probability is extremely low, there will be short periods where the desired output power will exceed $P_{MCPA}$.

Figure 5A:
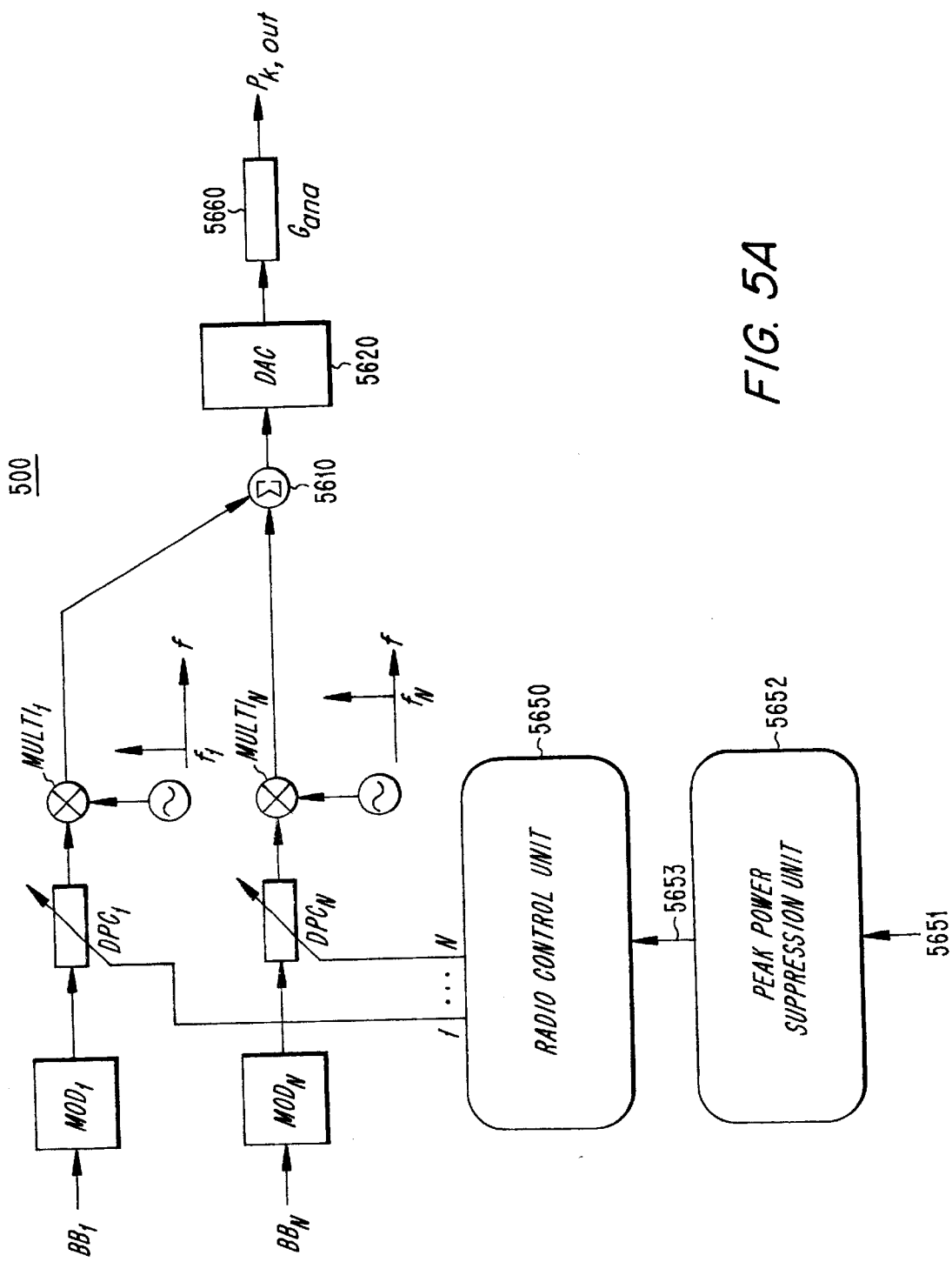
FIGS. 5A–5B illustrate the power control system according to exemplary embodiments of the present invention.

These short periods in which the desired output power will exceed $P_{MCPA}$ are handled by an exemplary embodiment of the present invention as illustrated in FIG. 5A. FIG. 5A illustrates a MCPA 500 according to an exemplary embodiment of the present invention. Similar to multicarrier transmitter 100 of FIG. 1, each of a number of baseband frequency data signals $BB_1 \ldots BB_N$ are forwarded to a corresponding modulator $Mod_1 \ldots Mod_N$. The modulated baseband signals $BB_1 \ldots BB_N$ are then forwarded to the digital power control modules $DPC_1 \ldots DPC_N$. The Radio Control Unit 5650 individually sets the gain of each digital power control module $DPC_1 \ldots DPC_N$.

The Radio Control Unit 5650 receives power command signals 5653 from a Peak Power Suppression Unit 5652. The signals 5653 are power control commands informing the Radio Control Unit 5650 of the actual output level at the transmitter, $P_{k,out}$, for each carrier and time slot. The Peak Power Suppression Unit 5652 calculates, on a time slot basis, the desired $P_{sum}$ by assuming the power control commands 5651 would not be modified by the Peak Power Suppression Unit 5652. The Peak Power Suppression Unit 5652 modifies the power control commands for one or several users, if the desired $P_{sum}$ exceeds the maximum tolerable threshold level for the MCPA, $P_{MCPA}$, in order to keep $P_{sum}$ less than or equal to $P_{MCPA}$. The actual desired power level signals 5651 are obtained from a conventional open or closed loop power control algorithm.

The signals generated by the digital power control modules $DPC_1 \ldots DPC_N$ are forwarded to multipliers $Multi_1 \ldots Multi_N$ where the signals are upconverted to a corresponding carrier frequency. The upconverted signals are then summed by adder 5610. The resultant compound signal is converted from digital to analog by DAC 5620. The analog signal is forwarded to an analog power control module 5660 which has a constant gain, $G_{ana}$. Although analog power control module 5660 is illustrated as a single element in FIG. 5A, the functionality of the analog power control module 5660 may be distributed over the analog transmitter chain, i.e., amplifiers, filters and upconverters, in order to minimize the effect on the noise figure.

The Peak Power Supervision Unit 5652 and the Radio Control Unit 5650 can be implemented using any known digital signal processing technology, including a general purpose computer, a collection of integrated circuits and/or application specific integrated circuitry (ASIC).

Figure 5B:
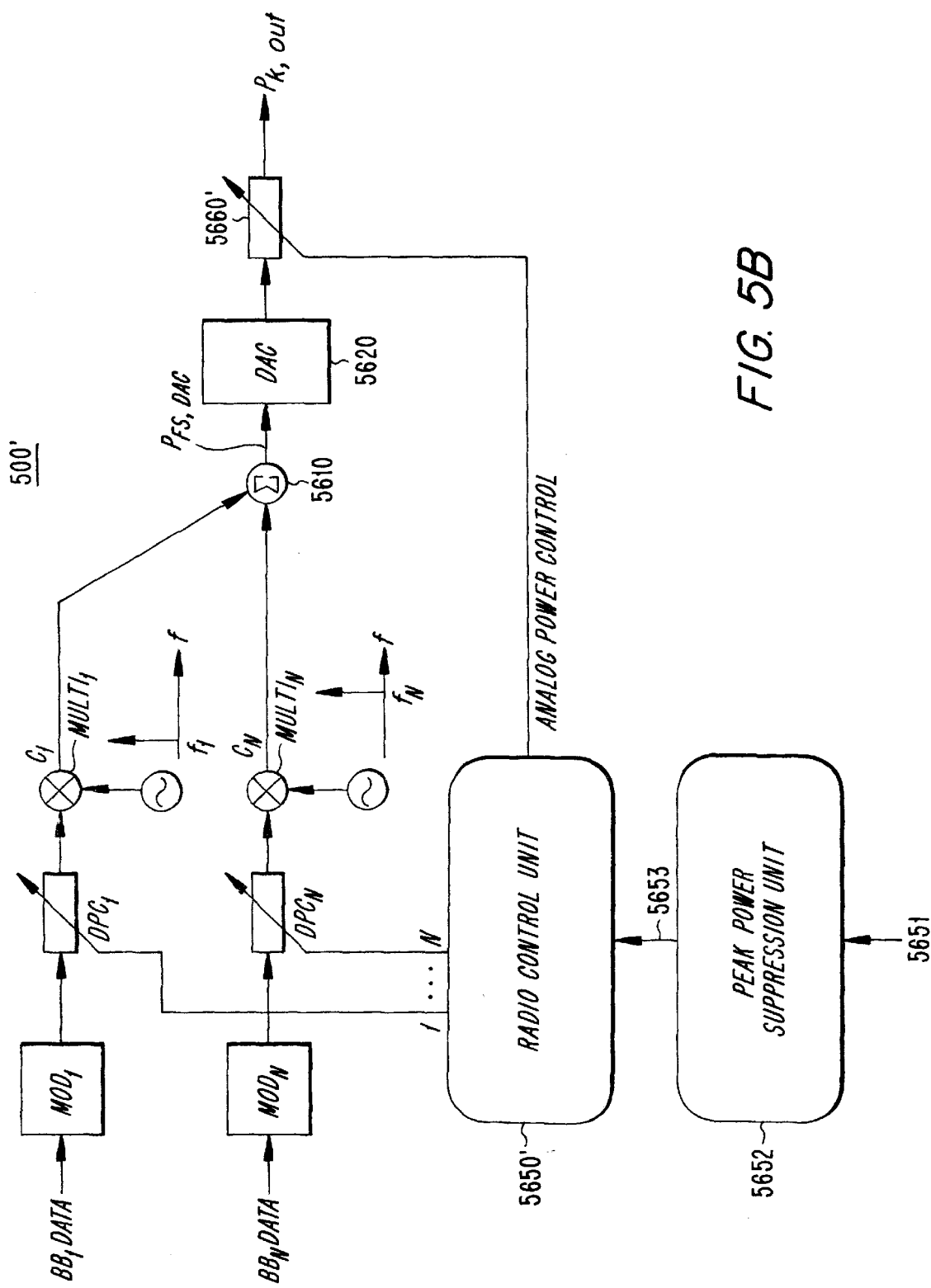

FIG. 5B illustrates a MCPA 500' according to another exemplary embodiment of the present invention. Similar to multicarrier transmitter 100 of FIG. 1, each of a number of N baseband frequency data signals $BB_1 \ldots BB_N$ are forwarded to a corresponding modulator $Mod_1 \ldots Mod_N$. The modulated baseband signals $BB_1 \ldots BB_N$ are then forwarded to the digital power control modules $DPC_1 \ldots DPC_N$. The Radio Control Unit 5650' individually sets the gain of each digital power control module $DPC_1 \ldots DPC_N$, such that the total in-phase power sum in to the DAC 5620 equals the full scale range of the DAC, $P_{FS,DAC}$.

The Radio Control Unit 5650° receives power command signals 5653 from a Peak Power Suppression Unit 5652. The signals 5653 are power control commands informing the Radio Control Unit 5650'0 of the actual output level at the transmitter, $P_{k,out}$, for each carrier and time slot. The Peak Power Suppression Unit 5652 calculates, on a time slot basis, the desired $P_{sum}$ by assuming the power control commands 5651 would not be modified by the Peak Power Suppression Unit 5652. The Peak Power Suppression Unit 5652 modifies the power control commands for one or several users, if the desired $P_{sum}$ exceeds the maximum tolerable threshold level for the MCPA, $P_{MCPA}$, in order to keep $P_{sum}$ less than or equal to $P_{MCPA}$. The actual desired power level signals 5651 are obtained from a conventional open or closed loop power control algorithm.

The signals generated by the digital power control modules $DPC_1 \ldots DPC_N$ are forwarded to multipliers $Multi_1 \ldots Multi_N$ where the signals are upconverted to a corresponding carrier frequency. The upconverted signals are then summed by adder 5610. The resultant compound signal is converted from digital to analog by DAC 5620. The analog signal is forwarded to an analog power control module 5660' which is controlled by an analog power control table stored in the Radio Control Unit 5650'. Although analog power control module 5660' is illustrated as a single element in FIG. 5B, the functionality of the analog power control module 5660' may be distributed over the analog transmitter chain, i.e., amplifiers, filters and upconverters, in order to minimize the effect on the noise figure.

In order to correctly adjust the absolute power level at the transmitter, $P_{k,out}$, for the carrier signals, the power level of the carrier signals are all adjusted by the same amount by the analog power control module 5660'. In order to adjust the gain of each digital power control module and the gain of the analog power control module 5660', the Radio Control Unit 5650' obtains, from the power control command signals 5653, the required power level of each carrier at the output of the transmitter $P_{k,out}$, i.e., the amount of transmit power required to provide a corresponding mobile station with an acceptable signal. Since the full scale range of the DAC 5620 is determined at the time of installation of the DAC 5620 in the multicarrier transmitter, the full scale range $P_{FS,DAC}$ of the DAC 5620 and the corresponding code can be programmed into the Radio Control Unit 5650'. The Radio Control Unit 5650' then sets the relative power for all carriers in such a way that the in-phase power sum in the digital domain supplied to the DAC 5620 equals the DAC's full scale range. Thus, in order to obtain the correct actual output power, $P_{k,out}$, at the transmitter for each carrier, Radio Control Unit 5650' applies an adjustable analog power gain, $G_{ana}$, for the analog power amplifier 5660'. Thus, all carriers will always be amplified by the same amount, $G_{ana}$, but $G_{ana}$ can change from time slot to time slot.

Figure 6A:
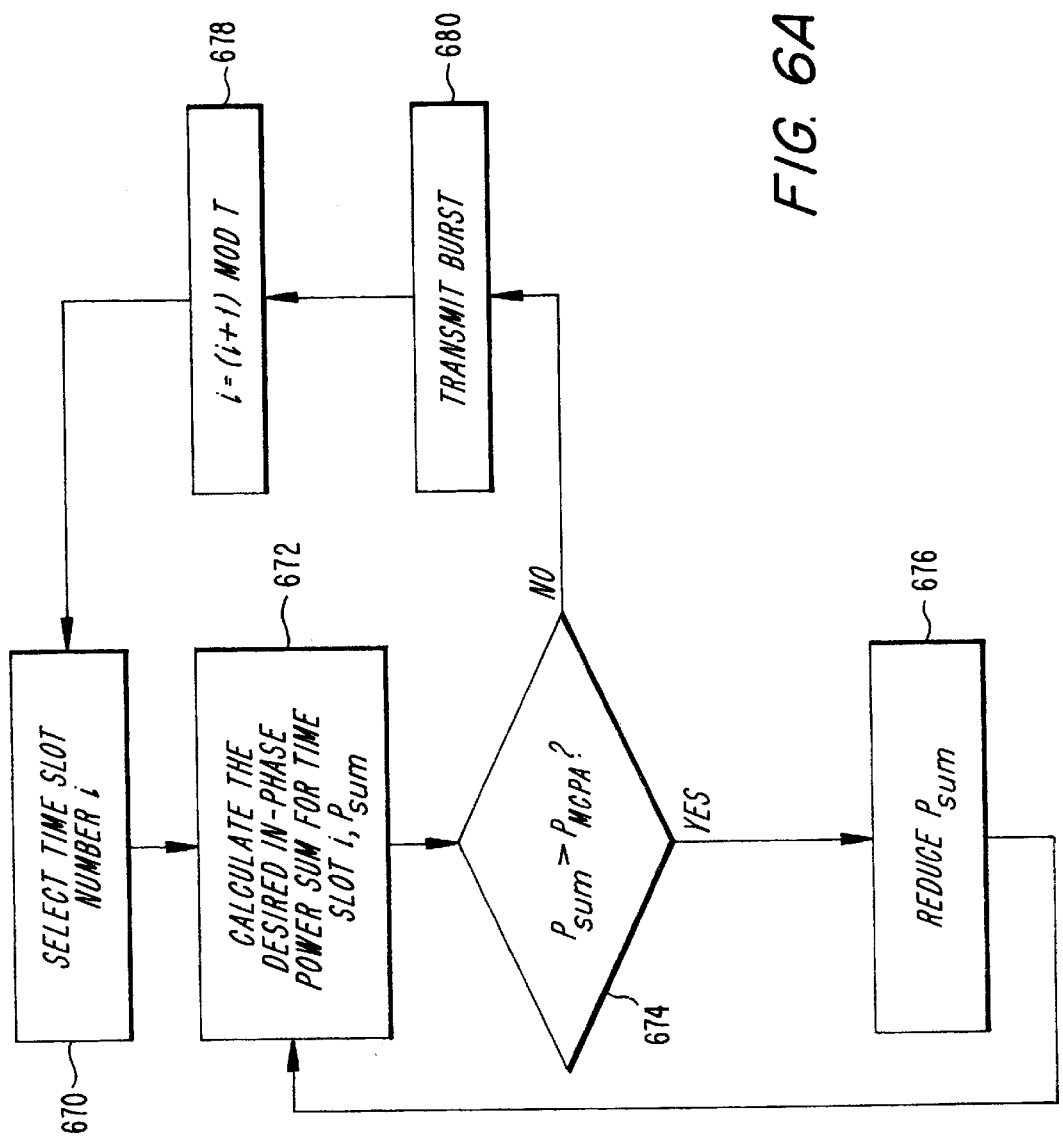

FIG. 6A illustrates a flow diagram of an exemplary embodiment of the present invention. The Peak Power Supervision Unit 5650 (see FIGS. 5A–5B) selects the present time slot i in block 670. The desired in-phase power sum for time slot i, $P_{sum}$, is calculated in block 672. In block 674, the value of $P_{sum}$ is compared to $P_{MCPA}$. If $P_{sum} \leq P_{MCPA}$ then the individual power level commands are allowed to pass to the Radio Control Unit 5650, 5650' (see FIGS. 5A–5B) without manipulation or adjustment (block 680). In block 678, i is incremented by one (i=(i+1) mod T), where T represents the number of time slots for the system (e.g., T=8 for a GSM system) and the above procedure is performed on the new time slot i.

If, however, $P_{sum} > P_{MCPA}$ then the present invention proceeds to block 676. In block 676, $P_{sum}$ is lowered and the present invention returns to block 672 and repeats blocks 674–676 until $P_{sum}$ is less than or equal to $P_{MCPA}$.

FIG. 6B illustrates an exemplary embodiment for block 676 of FIG. 6A. In block 676B$_1$, a user k is selected out of the total number of users on the time slot i ([1, . . . , M]). In block 676B$_2$, the power of a single speech burst for user k is set to zero. For the following speech burst, the power of a user k+1 is set to zero. This continues such that each user has their power set to zero for example, 1 (or more) out of 8 bursts per speech frame. Conventional error correction techniques, such as speech coding and interleaving, are used to mitigate the effects caused by the loss of a single speech burst so as to not compromise overall speech quality. The exemplary method of FIG. 6B effectively spreads quality reductions over multiple users so as to reduce the impact as much as possible on the perceived quality by any given user.

FIG. 6C illustrates another exemplary embodiment for block 676 of FIG. 6A. In block 676C$_1$, a user k is selected out of the total number of users on the time slot i ([1, . . . , M]). Then, in block 676C$_2$, the power of user k, $P_k$ is reduced. The present invention returns to block 672 of FIG. 6A and repeats blocks 674–676 selecting different values of k until $P_{sum}$ is less than or equal to $P_{MCPA}$.

FIG. 6D illustrates another exemplary embodiment for block 676 of FIG. 6A. In block 676D$_1$, all users k are selected out of the total number of users on the time slot i ([1, . . . , M]). Then in block 676D$_2$, the power of each user is either reduced equally or dependent to the power of each user. That is, the power of each user can be reduced by the same percentage (e.g., 20% dB or 20% W) or the same value (e.g., 1 dB or 1 W). Alternatively, the power of each user can be reduced dependent on their current power. For example, users which have higher powers are usually further away from a base station than users with lower powers. A reduction in power for a far-user could reduce signal quality more for the far-user than the same power reduction made for a near-user. Therefore, an exemplary embodiment of the present invention reduces the power dependent on the present power such that the power of near-users are reduced more than the power of far-users, e.g., inversely proportional to their present power. In a further exemplary embodiment of the present invention, the power of far-users are reduced more than the power of near-users since signals to the far-users would most probably be transmitted at a higher power than signals transmitted to the near-users.

FIG. 6E illustrates another exemplary embodiment for block 676 of FIG. 6A. In block 676E$_1$, the user k which has the greatest power is selected. Then in block 676E$_2$, the power of user k is reduced.

FIG. 6F illustrates another exemplary embodiment for block 676 of FIG. 6A. In block 676F$_1$, the user k which has the greatest perceived signal quality is selected. Alternatively, the user k which has the weakest perceived signal quality may be selected. Then in block 676F$_2$, the power of user k is reduced. The perceived signal quality can be determined, for example, by calculating a signal-to-noise ratio or bit-error rate.

The foregoing has described the principles, preferred embodiments and modes of operation of the present invention. However, the invention should not be construed as being limited to the particular embodiments discussed above. For example, while the invention has been described in the context of a TDMA system, it is understood the present invention is usable in the code division multiple access (CDMA) and frequency division multiple access (FDMA) systems as well. Thus, the above-described embodiments should be regarded as illustrative rather than restrictive, and it should be appreciated that variations may be made in those embodiments by workers skilled in the art without departing from the scope of the present invention as defined by the following claims.

We claim:

1. A method for power control in a radio communication system comprising:

determining a power requirement for an output signal;

comparing said power requirement with a threshold power value; and modifying said output signal when said power requirement is greater than said threshold power value such that the modified output signal has a modified power requirement which is less than or equal to said threshold power value, wherein said radio communication system is a TDMA system, said system having multiple time slots, and wherein said radio communication system includes a plurality of mobile terminals, said plurality of mobile terminals receiving over a plurality of radio carriers, each at a respective power level, wherein said output signal is modified by reducing the respective power levels for all of said plurality of mobile terminals inversely proportional to their respective power levels.

2. The method of claim 1, wherein said power requirement is a desired power requirement.

3. The method of claim 1 further comprising:

providing as an input to a multi-carrier power amplifier said modified output signal.

4. The method of claim 1, wherein said threshold power value is a threshold power value for a multi-carrier power amplifier.

5. The method of claim 1, wherein said threshold power value is a threshold power value for a component in a transmitter chain of said radio communication system.

6. The method of claim 1, wherein said comparing step further comprises comparing a power requirement for at least one time slot of said output signal to said threshold power value; and wherein said modifying step further comprises modifying said at least one time slot of said output signal when said power requirement of said at least one time slot of said output signal is greater than said threshold power value such that the modified at least one time slot of said output signal has a modified power requirement which is less than or equal to said threshold power value.

7. The method of claim 1, wherein said radio communication system includes a plurality of mobile terminals, said plurality of mobile terminals receiving over a plurality of radio carriers, said method further comprising:

transmitting information to at least one of said plurality of mobile terminals on successive time slots.

8. The method of claim 1, wherein said radio communication system includes a plurality of mobile terminals, said plurality of mobile terminals receiving over a plurality of radio carriers, each at a respective power level, said method further comprising:

transmitting information to at least one of said plurality of mobile terminals by interleaving said information on said time slots.

9. The method of claim 8, wherein said output signal is modified by reducing the respective power level for at least one time slot for said at least one of said plurality of mobile terminals.

10. The method of claim 1, wherein said radio communication system includes a plurality of mobile terminals, said plurality of mobile terminals receiving over a plurality of radio carriers, each at a respective power level, wherein said output signal is modified by reducing the respective power levels for all of said plurality of mobile terminals.

11. The method of claim 1, wherein said radio communication system includes a plurality of mobile terminals, said plurality of mobile terminals receiving over a plurality of radio carriers, each at a respective power level, wherein said output signal is modified by reducing the respective power level for at least one of said plurality of mobile terminals.

12. The method of claim 1, wherein said radio communication system includes a plurality of mobile terminals, said plurality of mobile terminals receiving over a plurality of radio carriers, each at a respective power level, wherein said output signal is modified by reducing the respective power level for one of said plurality of mobile terminals which has a greater respective power level than any of the other plurality of mobile terminals.

13. The method of claim 1, wherein said radio communication system includes a plurality of mobile terminals, said plurality of mobile terminals receiving over a plurality of radio carriers, each at a respective power level, wherein said output signal is modified by reducing the respective power level for one of said plurality of mobile terminals based on a respective signal quality value.

14. A power control system for a radio communication system comprising:

a power supervision unit which determines a power requirement for an output signal and compares said power requirement with a threshold power value; and a signal control unit which modifies said output signal when said power requirement is greater than said threshold power value such that the modified output signal has a modified power requirement which is less than or equal to said threshold power value, wherein said radio communication system is a TDMA system, said system having multiple time slots, and wherein said radio communication system includes a plurality of mobile terminals, said plurality of mobile terminals receiving over a plurality of radio carriers, each at a respective power level, wherein said output signal is modified by reducing the respective power levels for all of said, plurality of mobile terminals inversely proportional to their respective power levels.

15. The system of claim 14, wherein said modified output signal is provided as an input to a multi-carrier power amplifier.

16. The system of claim 14, wherein said threshold power value is a threshold power value for a multi-carrier power amplifier.

17. The system of claim 14, wherein said threshold power value is a threshold power value for a component in a transmitter chain of said radio communication system.

18. The system of claim 14, wherein said power supervision unit compares a power requirement for a at least one time slot of said output signal to said threshold power value; and wherein said signal control unit modifies said at least one time slot of said output signal when said power requirement of said at lest one time slot of said output signal is greater than said threshold power value such that the modified at least one time slot of said output signal has a modified power requirement which is less than or equal to said threshold power value.

19. The system of claim 14, wherein said radio communication system includes a plurality of mobile terminals, said plurality of mobile terminals receiving over a plurality of radio carriers, and wherein said radio communication system transmits information to at least one of said plurality of mobile terminals on consecutive time slots.

20. The system of claim 19, wherein said output signal is modified by reducing the respective power level of at least one time slot of said at least one of said plurality of mobile terminals.

21. The system of claim 14, wherein said radio communication system includes a plurality of mobile terminals, said plurality of mobile terminals receiving over a plurality of radio carriers, each at a respective power level, and wherein said radio communication system transmits information to at least one of said plurality of mobile terminals by interleaving said information on said time slots.

22. The system of claim 14, wherein said radio communication system includes a plurality of mobile terminals, said plurality of mobile terminals receiving over a plurality of radio carriers, each at a respective power level, wherein said output signal is modified by reducing the respective power level for all of said plurality of mobile terminals.

23. The system of claim 14, wherein said radio communication system includes a plurality of mobile terminals, said plurality of mobile terminals receiving over a plurality of radio carriers, each at a respective power level, wherein said output signal is modified by reducing the respective power level for at least one of said plurality of mobile terminals.

24. The system of claim 14, wherein said radio communication system includes a plurality of mobile terminals, said plurality of mobile terminals receiving over a plurality of radio carriers, each at a respective power level, wherein said output signal is modified by reducing the respective power level for one of said plurality of mobile terminals which has a greater respective power level than any of the other plurality of mobile terminals.

25. The system of claim 14, wherein said radio communication system includes a plurality of mobile terminals, said plurality of mobile terminals receiving over a plurality of radio carriers, each at a respective power level, wherein said output signal is modified by reducing the respective power level for one of said plurality of mobile terminals based on a respective signal quality value.

* * * * *